(12) United States Patent
Lillibridge et al.

(10) Patent No.: US 10,423,464 B2
(45) Date of Patent: Sep. 24, 2019

(54) PERSISTENT TICKET OPERATION

(71) Applicant: HEWLETT PACKARD ENTERPRISE DEVELOPMENT LP, Houston, TX (US)

(72) Inventors: Mark Lillibridge, Palo Alto, CA (US); Milind M. Chabbi, Palo Alto, CA (US); Haris Volos, Palo Alto, CA (US)

(73) Assignee: Hewlett Packard Enterprise Patent Development LP, Houston, TX (US)

( * ) Notice: Subject to any disclaimer, the term of this patent is extended or adjusted under 35 U.S.C. 154(b) by 153 days.

(21) Appl. No.: 15/333,820

(22) Filed: Oct. 25, 2016

(65) Prior Publication Data

US 2018/0095783 A1 Apr. 5, 2018

Related U.S. Application Data

(60) Provisional application No. 62/402,910, filed on Sep. 30, 2016.

(51) Int. Cl.
*G06F 9/52* (2006.01)
*G06F 9/48* (2006.01)
*G06F 9/46* (2006.01)
*G06F 9/30* (2018.01)

(52) U.S. Cl.
CPC .............. *G06F 9/52* (2013.01); *G06F 9/3009* (2013.01); *G06F 9/46* (2013.01); *G06F 9/466* (2013.01); *G06F 9/48* (2013.01); *G06F 9/485* (2013.01); *G06F 9/4843* (2013.01); *G06F 9/4881* (2013.01); *G06F 9/524* (2013.01); *G06F 9/526* (2013.01)

(58) Field of Classification Search
CPC .......... G06F 9/48; G06F 9/4843; G06F 9/485; G06F 9/4881; G06F 9/52; G06F 9/524; G06F 9/526
See application file for complete search history.

(56) References Cited

U.S. PATENT DOCUMENTS

| | | | |
|---|---|---|---|
| 5,895,494 A | 4/1999 | Scalzi et al. | |
| 6,141,794 A * | 10/2000 | Dice | G06F 8/447 |
| | | | 713/375 |
| 7,519,967 B1 * | 4/2009 | Russell | G06F 9/526 |
| | | | 718/102 |

(Continued)

OTHER PUBLICATIONS

He et al, "Preemption Adaptivity in Time-Published Queue-Based Spin Locks", May 2005, Rochester University, pp. 1-26.*

(Continued)

*Primary Examiner* — Charles M Swift
(74) *Attorney, Agent, or Firm* — Hewlett Packard Enterprise Patent Department

(57) ABSTRACT

In one example in accordance with the present disclosure, a method may include performing a transactional operation such that if one step of the transactional operation is performed, each other step of the transactional operation is performed. The transactional operation may include making a first copy, stored in a first persistent memory, of a next ticket number stored in a second persistent memory and updating the next ticket number in the second persistent memory. The method may also include determining when to serve a first thread based on the first copy of the next ticket number.

20 Claims, 8 Drawing Sheets

(56) References Cited

U.S. PATENT DOCUMENTS

| | | | | |
|---|---|---|---|---|
| 2004/0216112 A1* | 10/2004 | Accapadi | ............... | G06F 9/4881 718/103 |
| 2005/0022186 A1* | 1/2005 | Accapadi | ............... | G06F 9/4818 718/100 |
| 2006/0206901 A1* | 9/2006 | Chan | ............... | G06F 9/524 718/107 |
| 2007/0061805 A1* | 3/2007 | Brenner | ............... | G06F 9/485 718/100 |
| 2007/0136725 A1* | 6/2007 | Accapadi | ............... | G06F 9/526 718/100 |
| 2007/0300226 A1* | 12/2007 | Bliss | ............... | G06F 9/526 718/100 |
| 2008/0082771 A1* | 4/2008 | Pong | ............... | G06F 9/526 711/163 |
| 2008/0112423 A1* | 5/2008 | Christenson | ............ | H04L 49/90 370/412 |
| 2008/0168458 A1* | 7/2008 | Fachan | ............... | G06F 9/526 718/104 |
| 2009/0235005 A1* | 9/2009 | Hawk | ............... | G06F 9/4812 710/268 |
| 2009/0328053 A1* | 12/2009 | Dice | ............... | G06F 9/461 718/104 |
| 2012/0159498 A1* | 6/2012 | Wilmarth | ............... | G06F 9/526 718/103 |
| 2012/0198454 A1* | 8/2012 | Dawson | ............... | G06F 9/526 718/100 |
| 2012/0240126 A1* | 9/2012 | Dice | ............... | G06F 9/526 718/104 |
| 2012/0311606 A1* | 12/2012 | Marathe | ............... | G06F 9/526 718/107 |
| 2013/0014120 A1 | 1/2013 | Ross | | |
| 2013/0036476 A1* | 2/2013 | Roever | ............... | H04L 63/08 726/27 |
| 2013/0152096 A1* | 6/2013 | Park | ............... | G06F 9/54 718/102 |
| 2013/0174166 A1* | 7/2013 | Otenko | ............... | G06F 9/526 718/102 |
| 2015/0205733 A1* | 7/2015 | Steinmacher-Burow | | G06F 9/526 711/150 |
| 2016/0077739 A1* | 3/2016 | Falco | ............... | G06F 9/46 711/103 |
| 2016/0139966 A1* | 5/2016 | Greco | ............... | G06F 9/52 718/106 |
| 2017/0097779 A1* | 4/2017 | Steinmacher-Burow | | G06F 9/30 |
| 2017/0123861 A1* | 5/2017 | Otenko | ............... | G06F 9/526 |

OTHER PUBLICATIONS

Mellor-Crummey, J. M. et al., "Algorithms for Scalable Synchronization on Shared-Memory Multiprocessors," ACM Transactions on Computer Systems (TOCS) 9.1, Feb. 1991, pp. 21-65, available at https://pdos.csail.mit.edu/6.828/2010/readings/mcs.pdf.

Mohan, C., et al., "ARIES: A Transaction Recovery Method Supporting Fine-Granularity Locking and Partial Rollbacks Using Write-Ahead Logging," ACM Transactions on Database Systems (TODS) 17.1, Mar. 1992, pp. 94-162, available at http://dx.doi.org/10.1145/128765.128770.

\* cited by examiner

PERSISTENT TICKET OPERATION

CROSS-REFERENCE TO RELATED APPLICATION

This application claims the benefit of U.S. Provisional Application No. 62/402,910, filed Sep. 30, 2016.

BACKGROUND

A ticket lock may be used to manage a shared resource when the shared resource is accessed by a plurality of threads. A thread may crash or otherwise fail while attempting to acquire a ticket to access the shared resource.

BRIEF DESCRIPTION OF THE DRAWINGS

The following detailed description references the drawings, wherein.

Figure 1:
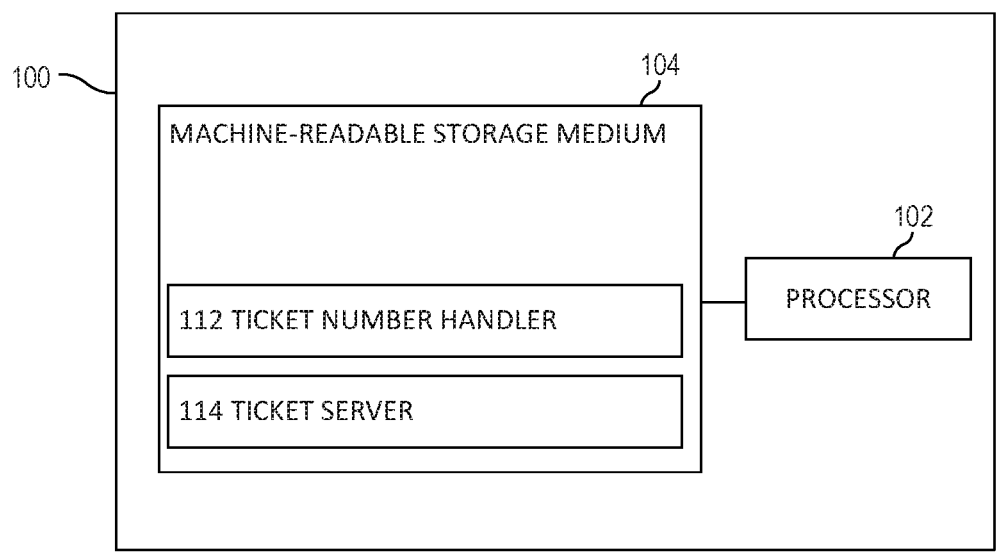
FIG. 1 is a block diagram of an example system for a persistent ticket operation.

Traditional ticket locks may often be used to protect volatile data structures present in main memory. Since the data structure itself may be lost on a system crash or power failure, there may not be any advantage to making such a lock resilient to such failures. Even in systems where fault tolerance is present, the recovery phase runs as a single process that does not coexist with other processes and hence it may not need the lock to persist across failures.

As persistent non-volatile memory (NVM) becomes widely used, it may be beneficial to redesign ticket locks in the context of a crash-recovery. In highly parallel, many-component systems, failures may be more commonplace. In such systems, it may not be desirable to suspend the entire system if a single process crashes. Hence, it may be beneficial to have a ticket lock that allows normal execution and crash recovery to coexist. It is challenging to determine the point of failure since not all state of execution is persistent. For example, processor registers, execution stack, and program counter may remain volatile due to the prohibitive cost of accessing NVM. Hence some state may be unavailable during recovery.

Concurrent access to data stored in byte-addressable non-volatile memory (NVM) may require using locks. A thread may fail at any step in the locking process when attempting to acquire the lock, holding the lock, releasing the lock, or waiting for the lock. Accordingly, a thread that has crashed may have partial amnesia due to the loss of transient data present in its processor registers and stack, among others, which are expected to remain volatile due to cost considerations of NVM accesses. Hence, a thread crashing while holding a transient state of the locking protocol may cause a deadlock, where no thread will ever be able to acquire the lock again.

Aspects of the present disclosure describe a mechanism to recover (resume) safely from any of the states in which a thread may crash when accessing a shared data stored in NVM. Specifically, if the lock was already acquired before the failure, the crash recovery may determine it already has the lock. Locks may persist to recover from the failure of one or more lock participants. Aspects of the present disclosure may not require use of a special recovery agent that suspends all other processes if one or more processes crash, may allow multiple processes to fail and recover simultaneously and may allow normal execution and crash recovery to run concurrently.

An example method for a persistent ticket operation may include performing a transactional operation, such that if one step of the transactional operation is performed, each other step of the transactional operation is performed, where the transactional operation includes making a first copy, stored in a first persistent memory, of a next ticket number stored in a second persistent memory and updating the next ticket number in the second persistent memory. The method may also include determining when to serve a first thread based on the first copy of the next ticket number.

As used herein, a "transactional" operation is an operation where from the outside all its steps are seen to have been performed or none of them are seen to have been performed. Equivalently, if one of the steps of the transactional operation is seen to be performed, all of its steps are seen to be performed. For example, a transactional operation to increment X and Y will be observed to either increment both X and Y or to increment neither X nor Y. This remains true even if the thread performing the operation crashes in the middle then recovers. Things may be arranged so that intermediate states such as between the crash and the recovery are not observed by users of the transactional operation; such states if observed could reveal partial performance. Transactional operations may be implemented using locks and logs.

A transactional operation may have a similar effect to an atomic operation. An atomic operation is an operation that completes in a single step relative to other threads. The other threads see the steps of the atomic operation as happening instantaneously. In the above method, the "steps" of the transactional operation may include (1) making a first copy of a next ticket number and (2) updating the next ticket number. Accordingly, either both the copying and the updating are observed or neither step is observed. Updating is not observed without copying being observed. Similarly, copying is not observed without updating being observed.

As used herein, "persistent" refers to continuing to store data after the end of the thread that created the data or last modified the data. It is important to note that the thread may end because the thread crashes. Accordingly, a persistent memory may be a memory that continues to store data after the end of the thread that created the data or last modified the data. Importantly, the persistent memory may continue to store data after the thread crashes. Memory that does not lose data when power is lost may be persistent.

A thread may be a sequence of programmed instructions managed by an operating system. Although one thread is discussed in the method above and in the figures below, a plurality of threads may participate in the persistent ticket operation described herein. The threads may be managed by a single operating system, multiple operating systems processes in the same operating system, or on different operating systems sharing a common persistent memory.

A ticket is a numerical value used to establish a thread's place in line. Tickets may be served in increasing numerical order. The next ticket number is a global variable shared by each thread using the persistent ticket lock. The next ticket number represents the next ticket number that will be given out. Each thread wanting to acquire the persistent ticket lock may request a ticket (this may increment the next ticket number) and wait until its ticket matches the ticket being served (the now serving ticket number).

FIG. 1 is a block diagram of an example environment 100 in which a persistent ticket operation, such as a persistent ticket lock, may be useful. System 100 may also include a processor 102 and a machine-readable storage medium 104 that may be coupled to each other through a communication link (e.g., a bus). Processor 102 may include a Central Processing Unit (CPU) or another suitable hardware processor. In some examples, machine-readable storage medium 104 stores machine readable instructions executed by processor 102. Machine-readable storage medium 104 may include any suitable combination of volatile and/or non-volatile memory, such as combinations of Random Access Memory (RAM), Read-Only Memory (ROM), flash memory, memristor, and/or other suitable memory. Machine-readable storage medium 104 may also include a random access non-volatile memory that can retain content when the power is off.

Machine-readable storage medium 104 may store instructions to be executed by processor 110 including instructions for and/or other components. Furthermore, in FIG. 1 and other Figures described herein, different numbers of components or entities than depicted may be used.

Processor 102 may execute instructions of ticket number handler 112 to transactionally make a copy, stored in a first persistent memory, of a next ticket number (stored in a second persistent memory) for a first thread and update the next ticket number in the second persistent memory. As used herein, "transactionally" may mean to perform steps such that if one step of the transactional operation is performed, each other step of the transactional operation is performed.

System 100 may utilize a variety of variables in managing the persistent ticket lock. For example, system 100 may utilize global variables that are accessible by each participant using the persistent ticket lock. The global variables may include a next ticket owner corresponding to the owner of the next ticket that will be dispensed by the system. The next ticket owner may initially be set to a special value to indicate that it is empty. Another global variable may include a next ticket number, corresponding to the next ticket that will be dispensed by the system. Yet another global variable, a now serving ticket number, may refer to the ticket that is currently being served by the system. The global variables, including the next ticket owner, next ticket number, and now serving ticket number may be stored in a persistent memory, such as a non-volatile memory (NVM).

Each thread using the persistent ticket lock may have a unique participant ID. Each thread using the lock may also have a local variable corresponding to a thread ticket owned by that thread. The thread ticket may be a copy made in the past of the next ticket number described above. The local variable may also be stored in a persistent memory, such as a non-volatile memory (NVM).

Ticket number handler 112 may dispense a ticket to a first thread by making a first copy of the next ticket number; it may do this by accessing the next ticket number, which is stored in a first persistent memory, and saving a copy of it as the thread ticket in a second persistent memory. The first and second persistent memories may be different memories, different portions of the same memory, the same memory, etc. Ticket number handler 112 may update the next ticket number using a variety of different techniques. For example, updating the next ticket number may include incrementing or decrementing the next ticket number, etc.

Performing the transactional operation may also include blocking the next ticket number from being accessed by threads other than the first thread. Ticket number handler 112 may block the next ticket number from threads other than the first thread by setting a next ticket owner to a participant ID of the first thread. The next ticket owner may also be located in a persistent memory. Blocking may prevent other threads being able to modify the next ticket number. Blocking the next ticket number may prevent other threads from accessing the next ticket number. Moreover, blocking the next ticket number from threads other than the first thread may allow the first thread to regain access if the thread crashes before completing its interaction with the persistent ticket lock. In some aspects, blocking the next ticket number may include locking the next ticket number. Blocking may be advisory access control; that is, it may not physically prevent threads from accessing but correctly programmed threads will choose not to access if they observe blocking in effect.

Performing the transactional operation may also include unblocking the next ticket number from being accessed by threads other than the first process. Ticket number handler 112 may unblock the next ticket number from a thread other than the first thread by clearing the next ticket owner and setting it to the special value. Unblocking may signify that no participating thread is in the middle of receiving a ticket (aka, being dispensed a ticket) and allow other threads to be dispensed tickets. In some aspects, unblocking the next ticket number may include unlocking the next ticket number.

A single atomic operation may be used to block the next ticket number from being accessed by threads other than the first thread. As described above, an atomic operation is an operation that completes in a single step relative to other threads For example, the single atomic operation may be used simultaneously to update the next ticket number and to perform one of blocking the next ticket number from threads other than the first thread and unblocking the next ticket number from threads other than the first thread. The atomic operation may be, for example, a double word compare-and-swap operation, a double word atomic store operation, etc. The atomic operation may be a single hardware operation such as a single instruction or memory fabric operation.

A double word compare-and-swap operation may use, for example, the next ticket owner and a participant ID associated with the first thread. If the compare and swap is successful the next ticket number may be incremented and the next ticket owner may be cleared. In this context "cleared" means to set the next ticket owner to the special value. In some aspects, the next ticket number may be incremented and/or the next ticket owner may be cleared as part of the single atomic operation.

Processor may execute instructions of ticker server 114 to determine when to serve the first thread based on the first copy of the next ticket number. Specifically, ticket server 114 may determine that a now serving ticket number is equal to the first copy of the next ticket number and then determine to serve the first thread.

Figure 2A:
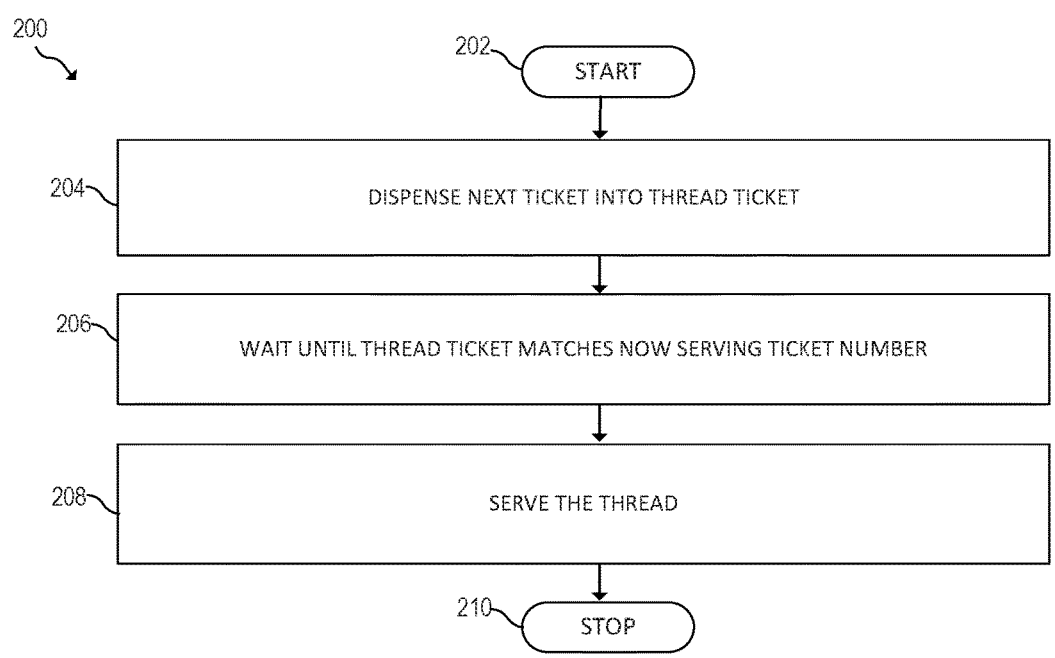
FIG. 2A is a flowchart of an example method for general overview of a persistent ticket operation.

FIG. 2A is a flowchart of an example method 200 for a general overview of a persistent ticket operation, such as acquiring a persistent ticket lock. Method 200 may be described below as being executed or performed by a system, for example, system 100 of FIG. 1 or system 600 of FIG. 6 described below. Other suitable systems and/or computing devices may be used as well. Method 200 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 200 may be implemented in the form of electronic circuitry (e.g., hardware). At least one block of method 200 may be executed substantially concurrently or in a different order than shown in FIG. 2A. Method 200 may include more or less blocks than are shown in FIG. 2A. Some of the blocks of method 200 may, at certain times, be ongoing and/or may repeat.

Method 200 may utilize a variety of variables in managing the ticket lock. For example, method 200 may utilize global variables that are accessible by each participant using the persistent ticket lock. The global variables may include similar global and local values as those described herein in reference to FIG. 1.

Method 200 may start at block 202 and continue to block 204, where the method may include dispensing a next ticket into a thread ticket. At block 206, the method may include waiting until the thread ticket matches the now serving ticket number. At block 208, the method may include serving the thread, which may be the current thread, which may be acquiring the lock. The method may continue to block 210 where the method may end.

Figure 2B:
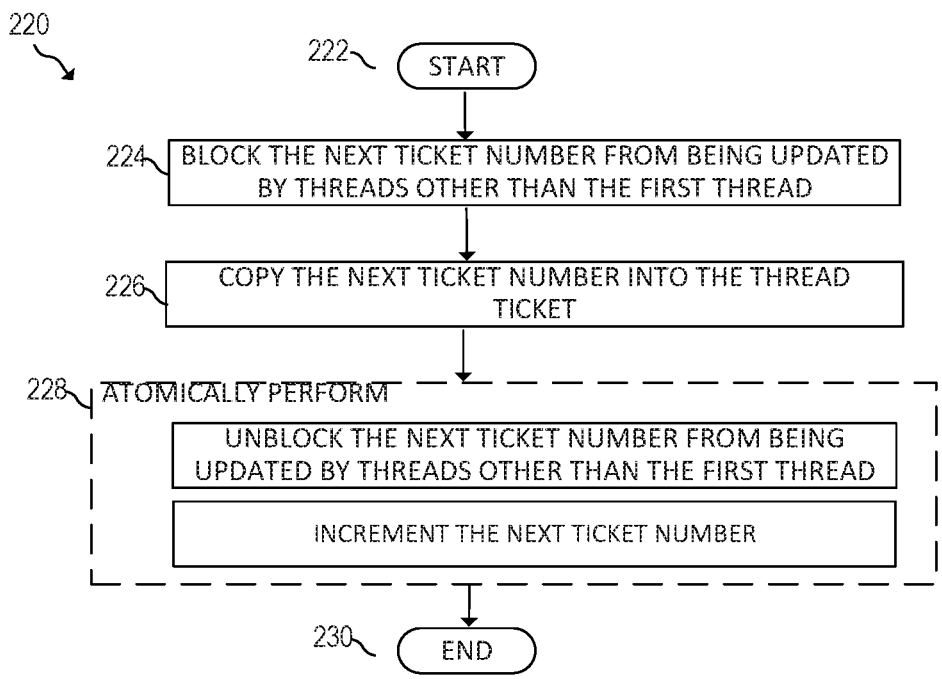
FIG. 2B is a flowchart of an example method for a persistent ticket operation.

FIG. 2B is a flowchart of an example method 220 for a persistent ticket operation, such as dispensing a ticket (e.g., step 204) for use in acquiring a persistent ticket lock. Method 220 may be described below as being executed or performed by a system, for example, system 100 of FIG. 1 or system 600 of FIG. 6 described below. Other suitable systems and/or computing devices may be used as well. Method 220 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 220 may be implemented in the form of electronic circuitry (e.g., hardware). At least one block of method 220 may be executed substantially concurrently or in a different order than shown in FIG. 2B. Method 220 may include more or less blocks than are shown in FIG. 2B. Some of the blocks of method 220 may, at certain times, be ongoing and/or may repeat.

Method 220 may utilize a variety of variables in managing the ticket lock. For example, method 220 may utilize global variables that are accessible by each participant using the persistent ticket lock. The global variables may include similar global and local values as those described herein in reference to FIG. 1.

The method 220 may begin at block 222 and proceed to block 224, where the method may include blocking the next ticket number from being updated by threads other than the first thread, which may be the current thread. This may prevent other threads from accessing the next ticket number if the first threads crashes. At block 226, the method may include making a copy of a next ticket number. Specifically, a copy of the next ticket number may be saved as the thread ticket, which, as described above, is a local value corresponding to the ticket owned by the thread. The copy may be made in a persistent memory.

At block 228, the method may include atomically unblocking the next ticket number from being updated by threads other than the first thread and incrementing the next ticket number Unblocking the next ticket number from being accessed by threads other than the first thread and may include clearing the next ticket owner and setting it to the special value. This may signify that no participating thread is receiving a ticket and allow other threads to be dispensed tickets.

In some aspects, the next ticket number may be updated in a way other than incrementing. The next ticket number may be updated by, for example, by decrementing the next ticket number or performing some other operation.

A single atomic operation may be used to increment the next ticket number and to unblock the next ticket number. The atomic operation may be, for example, a double word compare and swap operation, a double word atomic store operation, etc. For example, step 228 may be implemented by using a double word atomic store operation to atomically store the copy of the next ticket number plus one into the next ticket number (this has the effect of incrementing the next ticket number because other threads are blocked from accessing the next ticket number) and store the special value in the next ticket owner (this unblocks the next ticket number). This may require the next ticket number and next ticket owner variables to be located adjacent to each other in a persistent memory.

The method may continue to block 230 where the method may end.

Figure 2C:
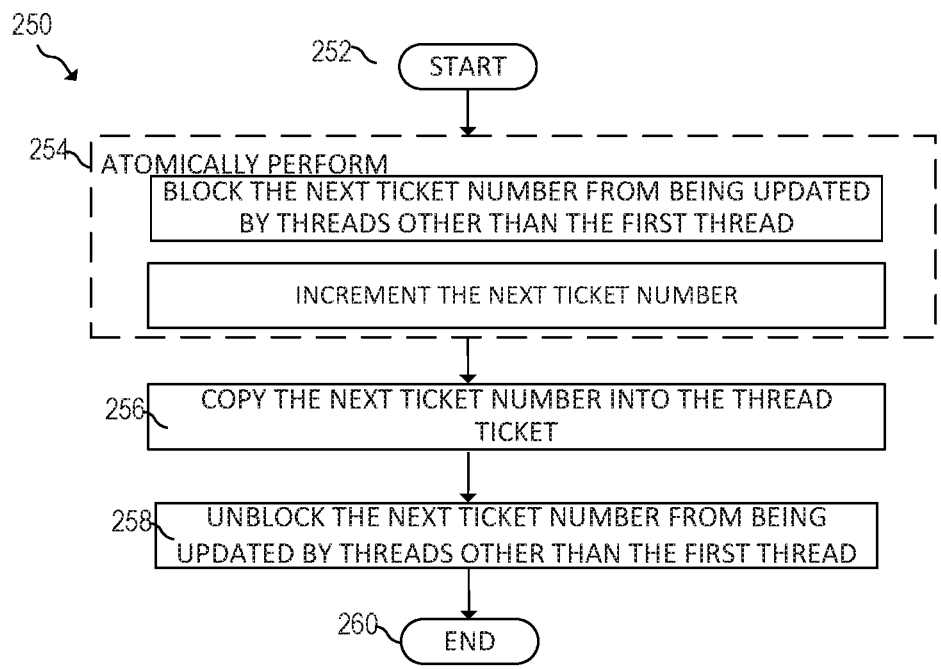
FIG. 2C is a flowchart of an example method for a persistent ticket operation that is an alternate implementation of the method presented in FIG. 2B.

FIG. 2C is a flowchart of an example method 250 for a persistent ticket operation, such as dispensing a ticket (e.g., step 204) for use in acquiring a persistent ticket lock. Method 250 may be an alternate implementation of the method 220 described above in reference to FIG. 2B above. In method 250, the next ticket number may be incremented atomically with the block step, instead of with the unblock step as in method 220. Step 254 may be implemented by using an atomic double word compare and swap operation. The double word compare and swap operation may attempt to change the pair of variables next ticket number, next ticket owner from holding the pair a recently read value of the next ticket number, the special value to holding the pair the recently read value of the next ticket number +1, the current thread's participant ID. This may require the next ticket number and next ticket owner variables to be located adjacent to each other in a persistent memory. If the operation succeeds, it has the effect of incrementing the next ticket number while simultaneously blocking the next ticket number from other threads than the current thread. If it fails, the operation can be repeated using a more recently read value of the next ticket number. The operation may be repeated until it succeeds.

Figure 3:
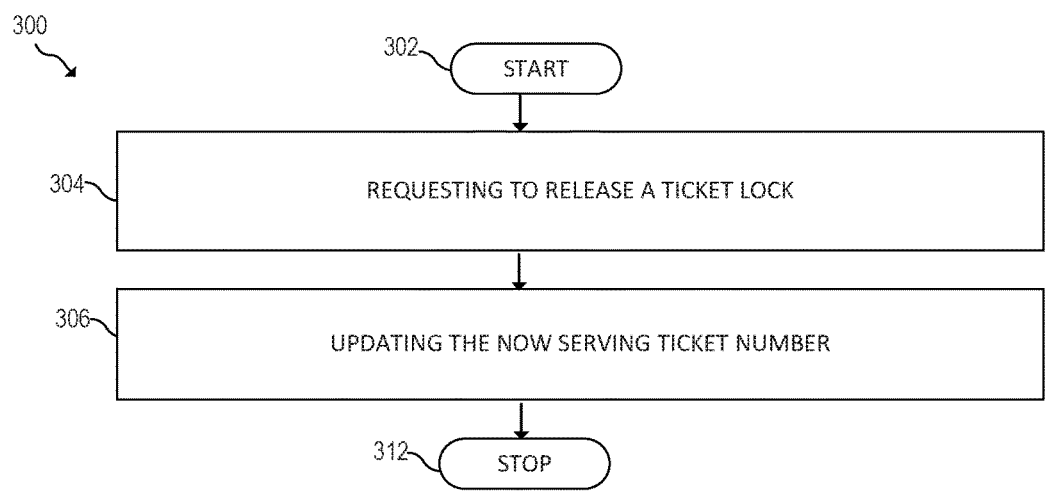
FIG. 3 is a flowchart of an example method for releasing a persistent ticket lock.

FIG. 3 is a flowchart of an example method 300 for releasing a persistent ticket lock. Method 300 may be described below as being executed or performed by a system, for example, system 100 of FIG. 1 or system 600 of FIG. 6 described below. Other suitable systems and/or computing devices may be used as well. Method 300 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 300 may be implemented in the form of electronic circuitry (e.g., hardware). At least one block of method 300 may be executed substantially concurrently or in a different order than shown in FIG. 3. Method 300 may include more or less blocks than are shown in FIG. 3. Some of the blocks of method 300 may, at certain times, be ongoing and/or may repeat. Method 300 may utilize similar global and local variables as those described herein with reference to FIG. 1.

Method 300 may start at block 302 and continue to block 304, where the method may include requesting to release a ticket lock. The request may be from a first thread. The first thread may indicate it wishes to release the ticket lock by calling a particular routine. It may do this when it currently has the persistent ticket lock; that is, it is currently being served. It may be being served when its thread ticket matches the now being served ticket number. At block 306, the method may include updating the now serving ticket number. Updating the now serving ticket number may include incrementing the now serving ticket number and/or other similar schemes. The method may continue to block 312 where the method may end. Updating the now serving ticket number may indicate that the current thread is no longer being served and that a new thread should be served.

Figure 4:
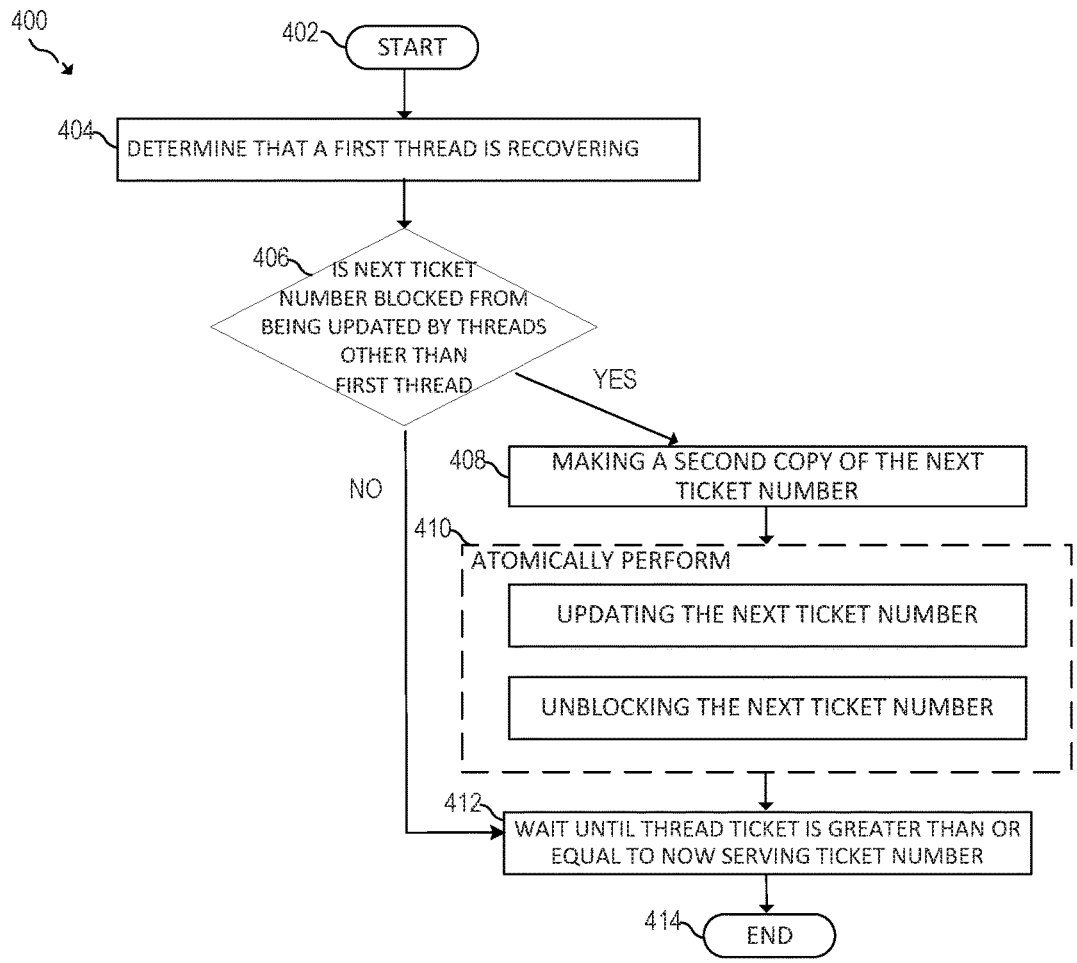
FIG. 4 is a flowchart of an example method for thread recovery using a persistent ticket lock.

FIG. 4 is a flowchart of an example method 400 for thread recovery using a persistent ticket lock. Method 400 may be described below as being executed or performed by a system, for example, system 100 of FIG. 1 or system 600 of FIG. 6 described below. Other suitable systems and/or computing devices may be used as well. Method 400 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 400 may be implemented in the form of electronic circuitry (e.g., hardware). At least one block of method 400 may be executed substantially concurrently or in a different order than shown in FIG. 4. Method 400 may include more or less blocks than are shown in FIG. 4. Some of the blocks of method 400 may, at certain times, be ongoing and/or may repeat. Method 400 may utilize similar global and local variables as those described herein with reference to FIG. 1.

Method 400 may start at block 402 and continue to block 404, where the method may include determining that a first thread is recovering from a failure. The failure may be, for example, a crash of a thread. The remainder of the steps of FIG. 4 may need to be performed before the first thread acquires or releases the persistent ticket lock again after a failure.

At block 406 the method may include determining if the next ticket number is blocked from being updated by threads other than the first thread. If it is determined that the next ticket number is blocked from being updated by threads other than the first thread (YES branch of block 406), then, at block 408, the method may include making a copy of the next ticket number. Specifically, a copy of the next ticket number may be saved into the thread ticket, which, as described above, is a local variable corresponding to the ticket owned by the first thread. The copy of the next ticket number may replace any previous copies of the next ticket number saved as the first thread's thread ticket. Previous copies may include, for example, the copy of the next ticket number made as described above in reference to block 204 of method 200, block 225 of method 220, block 256 of method 250, block 408 of method 400, block 504 of method 500, etc.

Accordingly, the new copy may replace any previous copies stored in the persistent memory. At block 410, the method may include atomically updating the next ticket number and unblocking the next ticket number from other threads. The next ticket number may be updated by, for example, incrementing the next ticket number, etc.

Unblocking the next ticket number from other threads may include clearing the next ticket owner and setting it to the special value. This may signify that no participating thread is receiving a ticket and allow other threads to be dispensed tickets.

A single atomic operation may be used to update the next ticket number and to unblock the next ticket number. The atomic operation may be, for example, a double word compare-and-swap operation, a double word atomic store operation, etc. Step 410 may be performed similarly to step 228, using single a double word atomic store operation.

At block 412, the method may include waiting until the thread ticket is greater than or equal to the now serving ticket number. The method may continue to block 414 where the method may end.

If it is determined that the next ticket number not is blocked from being updated by threads other than the first thread (NO branch of block 406), then the method may proceed to block 412, where the method may include waiting until the thread ticket is greater than or equal to the now serving ticket number. The method may continue to block 414 where the method may end.

Figure 5:
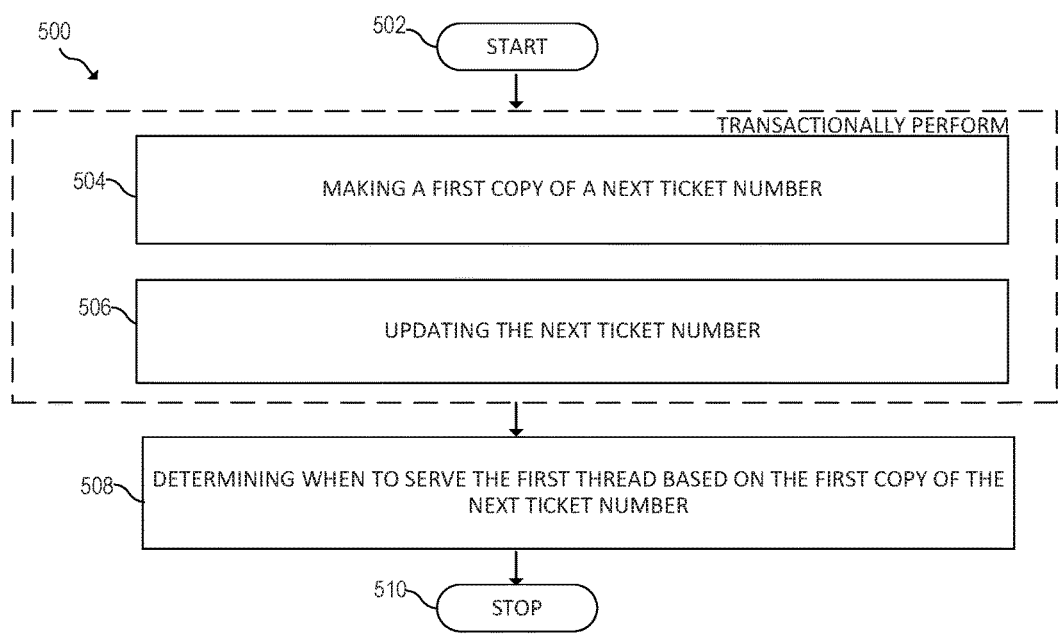
FIG. 5 is a flowchart of an example method for a persistent ticket operation.

FIG. 5 is a flowchart of an example method 500 for a persistent ticket operation, such as acquiring a persistent ticket lock. Method 500 may be described below as being executed or performed by a system, for example, system 100 of FIG. 1 or system 600 of FIG. 6 described below. Other suitable systems and/or computing devices may be used as well. Method 500 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 500 may be implemented in the form of electronic circuitry (e.g., hardware). At least one block of method 500 may be executed substantially concurrently or in a different order than shown in FIG. 5. Method 500 may include more or less blocks than are shown in FIG. 5. Some of the blocks of method 500 may, at certain times, be ongoing and/or may repeat.

Method 500 may start at block 502 and continue to block 504, where the method may include making a first copy, stored in a first persistent memory, of a next ticket number stored in a second persistent memory. At block 506, the method may include updating the next ticket number in the second persistent memory. Blocks 504 and 506 may be performed as part of a transactional operation, such that if one step of the transactional operation is performed, each other step of the transactional operation is performed. Performing the transactional operation may also include blocking the next ticket number from threads other than a first thread and unblocking the next ticket number from threads other than the first thread.

Blocking the next ticket number from threads other than the first thread may include setting a next ticket owner to a participant ID associated with the first thread. Unblocking the next ticket number from the threads other than the first thread may include clearing the next ticket owner variable. A single atomic operation may be used both to update the next ticket number and to perform at one of blocking the next ticket number and unblocking the next ticket number.

The atomic operation may be a double word compare-and-swap operation, a double word atomic store operation, etc.

At block 508, the method may include determining when to serve the first thread based on the first copy of the next ticket number. Block 508 may also include determining that a now serving ticket number is equal to the first copy of the next ticket number and determining to serve the first thread. The method may continue to block 510 where the method may end.

Figure 6:
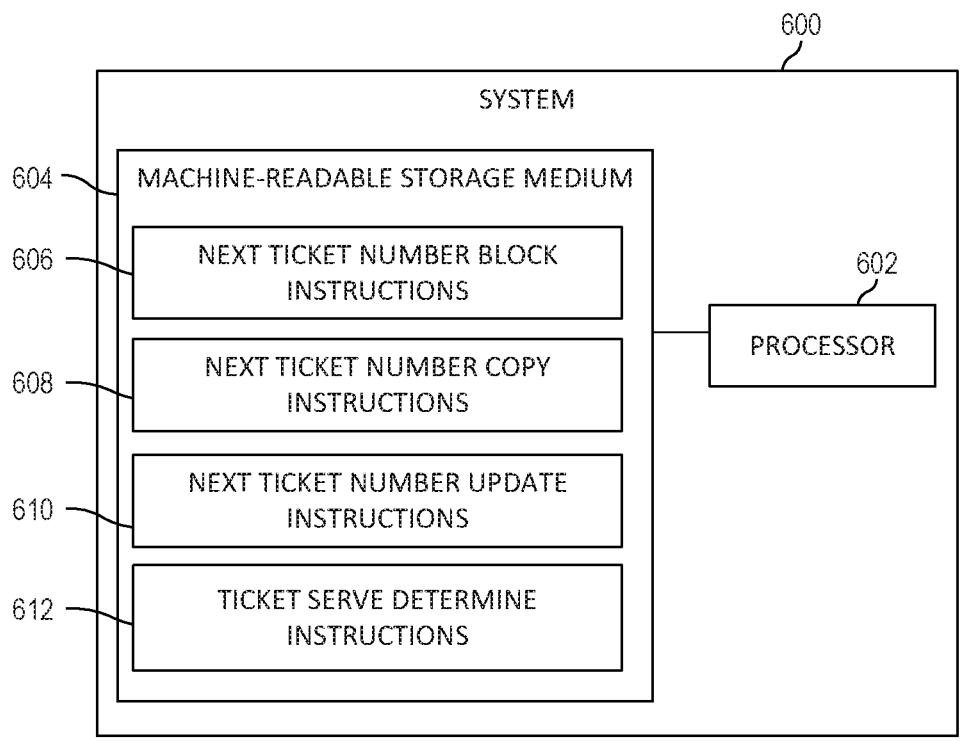
FIG. 6 is a block diagram of an example system for a persistent ticket operation.

FIG. 6 is a block diagram of an example system 600 for a persistent ticket lock persistent ticket operation, such as acquiring or releasing a persistent ticket lock. System 600 may be similar to system 100 of FIG. 1, for example. In the example illustrated in FIG. 6, system 600 includes a processor 602 and a machine-readable storage medium 604. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 602 may be at least one central processing unit (CPU), microprocessor, and/or other hardware devices suitable for retrieval and execution of instructions stored in machine-readable storage medium 604. In the example illustrated in FIG. 6, processor 602 may fetch, decode, and execute instructions 606, 608, 610 and 612 to perform a persistent ticket operation, such as acquiring or releasing a persistent ticket lock. Processor 602 may include at least one electronic circuit comprising a number of electronic components for performing the functionality of at least one of the instructions in machine-readable storage medium 604. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 604 may be any electronic, magnetic, optical, or other physical storage device that stores executable instructions. Thus, machine-readable storage medium 604 may be, for example, Random Access Memory (RAM), an Electrically-Erasable Programmable Read-Only Memory (EEPROM), a storage drive, an optical disc, and the like. Machine-readable storage medium 604 may be disposed within system 600, as shown in FIG. 6. In this situation, the executable instructions may be "installed" on the system 600. Machine-readable storage medium 604 may be a portable, external or remote storage medium, for example, that allows system 600 to download the instructions from the portable/external/remote storage medium. In this situation, the executable instructions may be part of an "installation package". As described herein, machine-readable storage medium 604 may be encoded with executable instructions for context aware data backup. The machine-readable storage medium may be non-transitory.

Referring to FIG. 6, next ticket number block instructions 606, when executed by a processor (e.g., 602), may cause system 600 to block a next ticket number from threads other than a first thread. Blocking the next ticket number may be done at the beginning of a ticket dispense routine and may indicate the beginning of the ticket dispense routine. Next ticket number copy instructions 608, when executed by a processor (e.g., 602), may cause system 600 to make a first copy of the next ticket number. Next ticket number update instructions 610, when executed by a processor (e.g., 602), may cause system 600 to update the next ticket number. Next ticket number copy instructions 608 and next ticket number update instructions 610 may be performed as part of a transactional operation, such that if one step of the transactional operation is performed, each other step of the transactional operation is performed. Performing the transactional operation may also include unblocking the next ticket number from threads other than the first thread.

At least one of blocking a next ticket number from threads other than the first thread and unblocking the next ticket number from threads other than the first thread may be performed as part of performing the transactional operation. A single atomic operation may be used both to update the next ticket number and to perform at least one of blocking the next ticket number and unblocking the next ticket number. The atomic operation may be a double word compare-and-swap operation, a double word atomic store operation, etc.

Ticket serve instructions 612, when executed by a processor (e.g., 602), may cause system 600 to determine when to serve the first thread based on the first copy of the next ticket number.

The foregoing disclosure describes a number of examples for a persistent ticket operation. The disclosed examples may include systems, devices, computer-readable storage media, and methods for a persistent ticket operation. For purposes of explanation, certain examples are described with reference to the components illustrated in FIGS. 1-6. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method, comprising:
    performing a transactional operation, such that if one step of the transactional operation is performed, each other step of the transactional operation is performed, wherein the transactional operation includes:
    making a first copy, stored in a first persistent memory, of a next ticket number adjacent to a next ticket owner stored in a second persistent memory;
    updating the next ticket number and the next ticket owner in the second persistent memory with a double word compare-and-swap-operation; and
    determining when to serve a first thread based on the first copy of the next ticket number and the next ticket owner, wherein the next ticket number and the next ticket owner are global variables shared by each thread using a persistent ticket lock in the first persistent memory and in the second persistent memory.

2. The method of claim 1 wherein performing the transactional operation further comprises:

blocking, using the persistent ticket lock, the next ticket number from being updated by threads other than the first thread; and
unblocking the next ticket number from being updated by threads other than the first thread.

3. The method of claim 2 wherein an atomic operation is used to update the next ticket number and to perform one of blocking the next ticket number, and unblocking the next ticket number.

4. The method of claim 3 wherein the atomic operation is a double word compare-and-swap operation.

5. The method of claim 3 wherein the atomic operation is a double word atomic store operation.

6. The method of claim 2 wherein blocking the next ticket number from threads other than the first thread comprises setting the next ticket owner to a number associated with the first thread.

7. The method of claim 2 comprising:
determining that the first thread is recovering from a crash incident;
determining that the next ticket number is blocked from being updated by threads other than the first thread;
making a second copy of the next ticket number; and
unblocking the next ticket number.

8. The method of claim 2, wherein the determining when to serve the first thread is also based on a now serving ticket number, the method comprising:
requesting to release a ticket lock; and
updating the now serving ticket number.

9. The method of claim 8 further comprising:
determining that the now serving ticket number is equal to the first copy of the next ticket number; and
determining to serve the first thread.

10. A system comprising:
a first persistent memory;
a second persistent memory;
a processor to:
make a copy, stored in a first persistent memory, of a next ticket number adjacent to a next ticket owner for a first thread, wherein the next ticket number is a global variable shared by each thread using a persistent ticket lock in the first persistent memory and in the second persistent memory stored in a second persistent memory, and
update the next ticket number and the next ticket owner in the second persistent memory with a double word compare and swap operation; and
a ticket server to determine when the copy matches a now serving ticket number.

11. The system of claim 10 wherein the processor blocks the next ticket number from being updated by threads other than the first thread and unblocks the next ticket number from being updated by threads other than the first thread.

12. The system of claim 11 wherein a single atomic operation is used both to update the next ticket number and to perform one of blocking the next ticket number and unblocking the next ticket number.

13. The system of claim 11 wherein blocking the next ticket number by the first thread comprises setting the next ticket owner to a number associated with the first thread.

14. The system of claim 11 comprising:
a second processor to:
determine that the first thread is recovering from a crash incident;
determine that the next ticket number is blocked from being updated by threads other than the first thread;
make a second copy of the next ticket number; and
unblock the next ticket number.

15. A non-transitory machine-readable storage medium configured to store instructions which, when executed by a processor, cause a system to perform a method comprising:
blocking, using a persistent ticket lock, a next ticket number from being updated by threads other than a first thread, wherein the next ticket number is a global variable shared by each thread accessing a first persistent memory and a second persistent memory; and
performing a transactional operation, such that if one step of the transactional operation is performed, each other step of the transactional operation is performed, wherein the transactional operation includes:
making a first copy, stored in the first persistent memory, of the next ticket number stored adjacent to a next ticket owner in the second persistent memory, and
updating the next ticket number and the next ticket owner in the second persistent memory with a double word compare-and-swap operation; and
determining when to serve the first thread based on the first copy of the next ticket number and the next ticket owner, wherein the next ticket number and the next ticket owner are global variables shared by each thread using a persistent ticket lock in the first persistent memory and in the second persistent memory.

16. The non-transitory machine-readable storage medium of claim 15, wherein the method further includes:
setting a next ticket owner variable to a number associated with the first thread as part of blocking the next ticket number from being updated by threads other than the first thread.

17. The non-transitory machine-readable storage medium of claim 15 wherein, in the method, blocking the next ticket number from being updated by threads other than the first thread is performed as part of performing the transactional operation.

18. The non-transitory machine-readable storage medium of claim 15 wherein, in the method, a single atomic operation is used to update the next ticket number and perform one of blocking the next ticket number from being accessed by threads other than the first thread and unblocking the next ticket number from being accessed by threads other than the first thread.

19. The non-transitory machine-readable storage medium of claim 15, wherein, the method further comprises:
determining that the first thread is recovering from a crash incident;
determining that the next ticket number is blocked from being updated by threads other than the first thread;
making a second copy of the next ticket number; and
unblocking the next ticket number from being updated by threads other than the first thread.

20. The non-transitory machine-readable storage medium of claim 15, wherein, in the method, determining when to serve the first thread is also based on a now serving ticket number and wherein the method further includes:
requesting to release the persistent ticket lock; and
updating the now serving ticket number.

* * * * *